July 22, 1941  C. V. CULLINAN  2,250,361
PORTABLE HOLDER
Filed Sept. 15, 1939
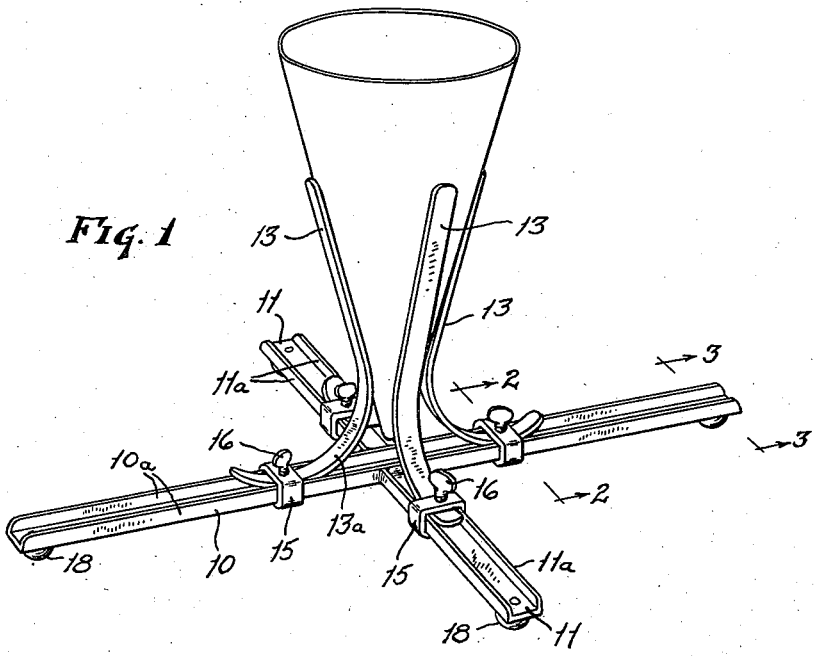
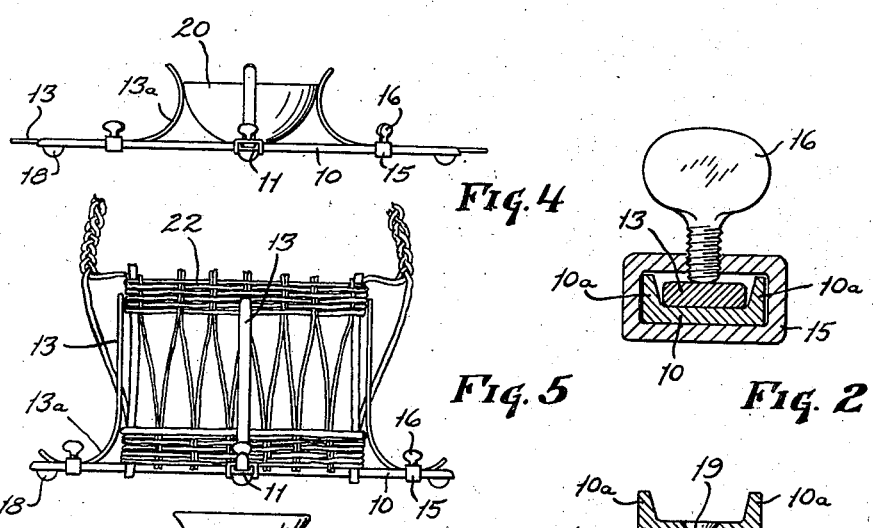
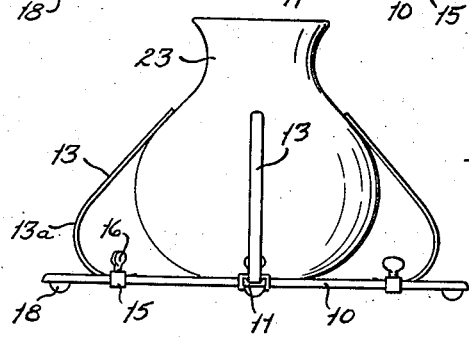
INVENTOR.
CHARLES V. CULLINAN
BY Bates, Golrick, & Teare
ATTORNEYS Patented July 22, 1941

2,250,361

UNITED STATES PATENT OFFICE 2,250,361

PORTABLE HOLDER

Charles V. Cullinan, Cleveland, Ohio

Application September 15, 1939, Serial No. 294,997

5 Claims. (Cl. 248—44)

This invention is directed to improvements for utility holders, and has for its general object the provision of a vessel and object holder which is adaptable to the supporting of vessels and objects of various shapes.

A further object of the present invention is the provision of a stand construction, which is adaptable to the supporting of odd-shaped unstable vessels, such as vases, jardinieres, flower pots, floral baskets and the like.

Other objects of my invention will become apparent from the following description, which refers to the accompanying drawing illustrating a preferred embodiment of the invention and the utility thereof.

In the drawing, Fig. 1 is a perspective view of my stand construction, showing the same adjustably adapted to support a vessel or container of a conic shape; Fig. 2 is an enlarged cross-sectional view, taken substantially along the line 2—2 of Fig. 1, and illustrates a clamping means for one of the adjustable elements of the stand construction, and Fig. 3 is a similar view taken substantially along the line 3—3 of Fig. 1. Fig. 4 is an elevation showing the stand adjusted to support a bowl-shaped vessel; Fig. 5 is an elevational view of the stand showing the same adjusted to support an oblong shaped bracket; Fig. 6 is an elevational view showing the stand adjusted to support a vase.

My invention contemplates the provision of a stand structure which may be economically formed from standard steel shapes and one of the features of the invention is to construct the stand in such manner that the center of gravity of the stand and supported object, such as a vessel supported thereby, will be close to the supporting surface upon which the stand rests, and thus prevent tipping of the vessel and its contents when carelessly or accidentally bumped and during transportation of a vessel by a vehicle.

The base of the stand may comprise a steel bar 10 formed of commercially available channel iron, the bar being utilized with the flange portions 10a disposed upwardly, and channel bar members 11 which are attached at a central point to the bar 10 by welding, riveting or in some other suitable manner, whereby all the channel members are arranged in a common plane.

The channels of the bar members 10 and 11 serve to receive the lower reaches of flat bar or arm members 13, which have substantially one-half the length thereof of curvilinear formation, and the remaining half thereof straight, as shown. The bar members 13 are of such dimension to have sufficiently rigid beam strength to adequately support any reasonable load placed upon the stand structure. The width of the bar members 13 is such as to substantially correspond to the width of the bottom of the channel formation of the bar members 10 and 11, as shown in cross-section in Fig. 2, whereby the flanges 10a and 11a of the channel members 10 and 11 serve as slideways for the lower reaches of the bars or arms 13.

Adjustable clamping means for the bar members 13 may comprise rectangularly shaped collars 15 and wing-nuts 16. The rectangular openings in the collars 15 are such as to afford a sliding engagement between the channel bars 10 and 11 and the internal faces of the openings of the collar members 15.

Disposed at the outer end thereof are rest members 18, attached to the underfaces of the channel members 10 and 11 in any convenient manner. I prefer to form the rest members 18 of resilient material, and the members 18 may be secured to the bar members 10 and 11 by rivets 19, or any other suitable means. It will be noted that the rest members 18 are of such height that the base bars 10 and 11 will be disposed at a sufficient height above the supporting surface to permit convenient sliding of the collar members 15 along the channel bars 10 and 11 when the arms 13 are being adjusted into contact with the side or sides of a vessel.

By shaping the arms 13, in the manner illustrated and by having the clamping means conveniently disconnectable therefrom, the arms 13 may be assembled relative to the channel bars with either the curved end arms in clamped engagement relative to the channel bars, as shown in Figs. 1, 5 and 6, or if the shape of the vessel to be supported is such that it would be more desirable to have the curved portions of the member 13 in engagement thereof, the position of the member 13 may be reversed, as shown in Fig. 4, in which figure the stand is illustrated as being assembled to support a bowl-shaped vessel 20.

In Fig. 5 the members 13 are shown in adjusted position to support an oblong shaped basket 22, while in Fig. 6 the members 13 are assembled relative to the channel members, whereby the curvilinear portions 13a thereof extend inwardly toward the center of the stand structure and the upper straight regions thereof engage the curved surface of a vase 23.

From the description of the adaptability of the device, as illustrated in the drawing, it will be apparent that oblong vessels, round vessels, coniformed vessels and objects of various shapes, may be supported by the stand structure in a firm manner and by simple, convenient adjustment of the bar members 13, and the clamping means therefor.

From the foregoing description of the adaptability of my invention, it will be apparent that a wide range of utility is available through the use thereof. The reversible feature of the supporting arms 13, while being adjustable toward and away from the center of the base, permits of the use of the device for the holding or supporting of conventionally shaped objects, such as poles and staffs, as well as odd shaped objects of varying bulk. The device, by reason of the novel arrangement and shape of the parts, may be manufactured economically in small lots and the product is sturdy in construction, while being light in weight, thus affording convenient handling of the same.

I claim:

1. A vessel holder, comprising a base structure formed of channel members disposed substantially in a centrally intersecting relation with the channel formations thereof exposed upwardly, vessel-engaging means in the form of independently adjustable bars having the lower reaches thereof in slidable and load-reactive engagement with the flanges of the channel members and clamping means comprising a collar surrounding the channel members and the lower reaches of the vessel-engaging bars and slidable relatively to one of them for clamping them together.

2. A vessel holder comprising a base structure formed of intersecting iron channel members with the channels thereof extending upwardly, vessel-engaging means in the form of independently adjustable bars in slidable engagement with the channel members, and adjustable clamping means slidably engaging the channel members and the vessel-engaging bars for clamping the latter together.

3. A vessel holder, comprising a base structure formed of channel bars joined in a substantialy central intersecting relation with the channel formations thereof extending upwardly, vessel-engaging means in the form of independently adjustable members having the lower regions thereof in slidable and load-reactive engagement with the channels of the channel bars, adjustable collar means slidably surrounding each of the channel members and clampingly engaging the lower reaches of each of the adjustable members and rest pads on the channel bars to support the channel bars in spaced relation to a supporting surface whereby said collar means are also disposed in spaced relation to said surface.

4. In a stand structure of the character described, the combination of a base structure providing channels, object-supporting flat strip iron arms in alignment with the channels, each of said arms being formed to have a curvilinear portion and a straight portion and both portions being adapted to fit into and slide along the base channels, and clamping means associated with the lower reach of each of said arms and the channel formations of the base structure and adaptable to the clamping of both the straight and the curvilinear portions of said arms to the base structure.

5. In a device of the character described the combination of a base structure comprising a channel member, an article supporting transversely flat and longitudinally curvilinear arm slidably disposed in load-reactive engagement with the channel of said channel member, and a clamping element extending over said channel and slidably carried by said channel member whereby said arm may slide in said channel below said element.

CHARLES V. CULLINAN.